United States Patent Office 3,010,256
Patented Nov. 28, 1961

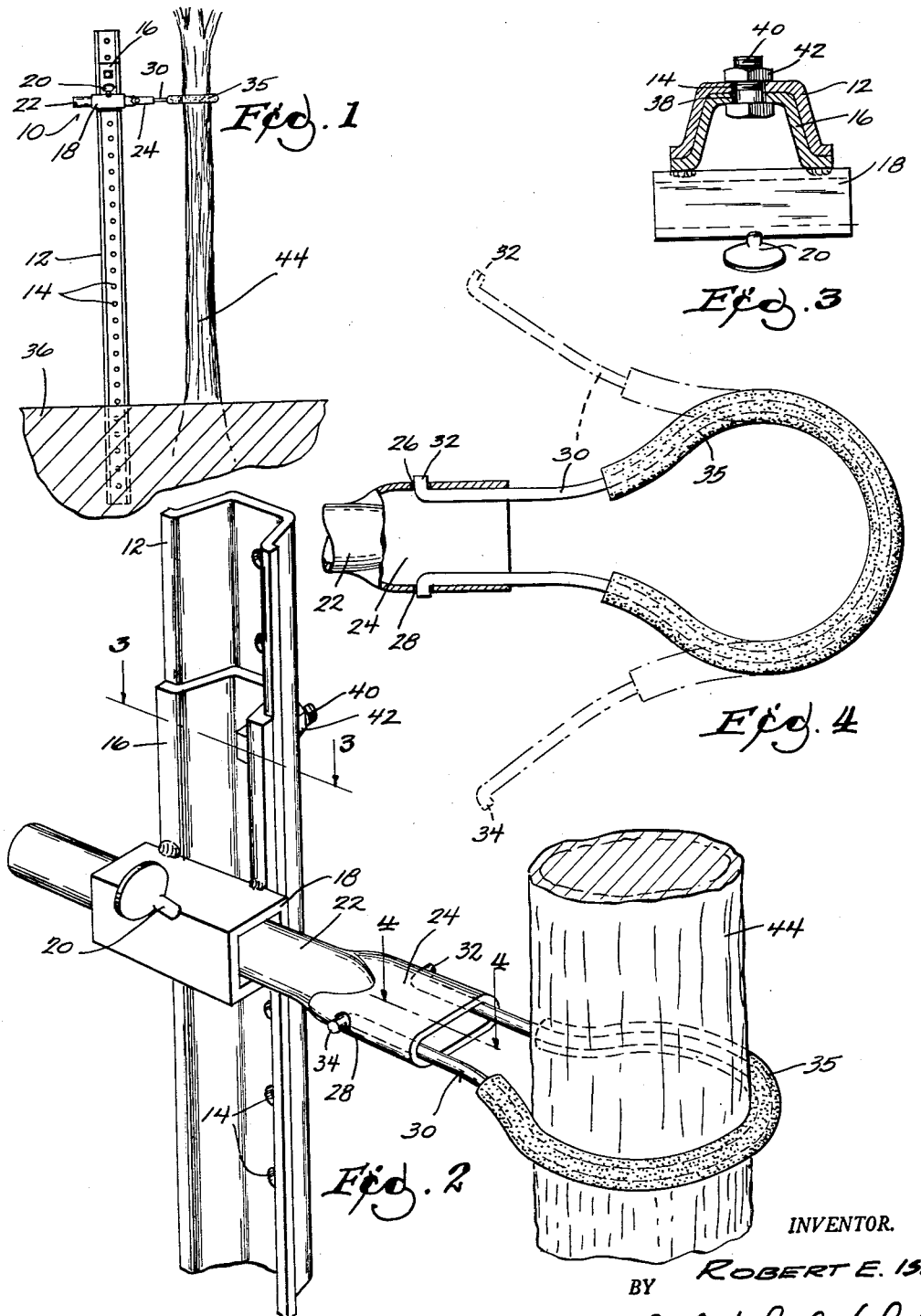

3,010,256
TREE SUPPORT
Robert E. Ise, 3046 N. 56th St., Milwaukee, Wis.
Filed Nov. 30, 1959, Ser. No. 856,207
1 Claim. (Cl. 47—42)

This invention relates to a tree or plant supporting device and more particularly to a device for training and supporting plants and trees during growth.

Certain trees or plants have inadequate root structure to make them self-supporting in the position desired, or in the erect position in which they naturally tend to grow. Furthermore most trees and plants when transplanted are dependent for a time upon some artificial assistance to hold them erect while adequate natural root structure develops and the soil settles in the vicinity of such root structure. It is the object of this invention to provide equipment satisfactory and adequate to provide such assistance.

The support of the present invention is adjustable and designed to provide an attachment between a plant or tree and a generally up-right member such as a metal fence post.

In the drawings:

FIG. 1 is a side elevation of a support embodying the present invention and showing its relationship to a plant which it is supporting;

FIG. 2 is a perspective view of the support of FIG. 1;

FIG. 3 is a section taken along line 3—3 of FIG. 2;

FIG. 4 is a plan view of a portion of the structure shown in FIG. 1, a fragmentary portion comprising a section on line 4—4 of FIG. 2.

In the drawings a tree support indicated generally by the numeral 10 is shown mounted upon a channeled metal fence post 12. Spaced longitudinally along fence post 12 are a series of openings 14.

The tree support 10 includes a channeled post segment 16 which has transversely fixed thereon a tube 18. A locking screw 20 is threaded through the surface of tube 18 and extends into the interior. Tubular support arm 22 is inserted through tube 18 and is locked in a selected position by tightening locking screw 20 and thereby wedging support arm 22 in fixed position within tube 18. The portion of support arm 22 which extends from tube 18 toward the plant to be supported has a flatly partially collapsed end 24. A pair of oppositely disposed apertures 26 and 28 are located in the rounded margins rearwardly of the partially collapsed end 24. A spring type plant encircling and supporting clamp 30 has tang ends 32 and 34 abruptly bent outwardly as shown in the drawings, and these tangs can be squeezed together for insertion within end 24 of support arm 22 and then released to expand tangs 32 and 34 outwardly through apertures 26 and 28, locking clamp 30 in position. Particular attention is directed to FIG. 4 in which the completely expanded position of clamp 30 is shown in dotted line and the compressed position is shown in solid line. This showing will further clarify how the tangs 32 and 34 spring outwardly through the apertures 26 and 28.

Abrasion resisting shield 35 surrounds the portion of clamp 30 which surrounds and supports the plant and can be made from any desirable material, such as Neoprene.

When supporting a plant or tree in the manner shown in the drawings, post 12 has one end emplanted firmly in the earth indicated at 36 and extends substantially perpendicularly therefrom. Post segment 16 fits complementarily into the channel of post 12 and has an opening 38 therein corresponding to the openings 14 in post 12. The post segment 16 and post 12 may be nested as shown in FIGS. 2 and 3 since they are complementarily shaped. Segment 16 may be moved longitudinally along post 12 until it is adjusted to the desired height and aperture 38 and one of the apertures 14 are aligned. A bolt 40 is passed therethrough and a nut 42 is threaded on bolt 40 and tightened to lock the post segment 16 and plant support 10 in place. Support arm 22 may then be adjusted within tube 18 to extend from the post 12 the required distance to receive clamp 30 surrounding a plant such as tree 44 and apply pressure to maintain a desirable position.

Where a particular plant or tree is initially weak or starts to develop an undesirable bend or kink in its stem or trunk an additional clamp and accessory parts may be secured to the post and tree at the correct level to give the special corrective support needed.

I claim:

For support of a growing plant or tree, a post and post segment having means for interconnection thereof at a selected position along said post, an apertured tubular member fixed to said segment transversely thereof, a support arm slidably and rotatably receivable in said tubular member and having a flattened oval shaped end extremity with opposite sharply curved walls, said sharply curved walls being apertured inwardly from the end of said flattened oval portion, a spring clamp provided with normally outstanding extremities and with a portion embraceably receivable about the plant or tree to be supported with said extremities in approximately parallel relation, each of said extremities having an abruptly outwardly directed terminal receivable in one of said apertures, and means for holding said support arm in an adjusted position.

References Cited in the file of this patent
UNITED STATES PATENTS
2,345,455    Brumfield _____ Mar. 28, 1944
FOREIGN PATENTS
14,815    Great Britain _____ 1912
238,830    Great Britain _____ Aug. 27, 1925
320,689    Great Britain _____ Oct. 24, 1929